(12) United States Patent
Eberle et al.

(10) Patent No.: US 8,871,084 B2
(45) Date of Patent: Oct. 28, 2014

(54) FLUID FILTER COMPRISING A PROTECTED LIQUID SENSOR

(75) Inventors: Richard Eberle, Muenster (DE); Burkhard Kubsch, Horstmar (DE)

(73) Assignee: Hengst GmbH & Co. KG, Muenster (DE)

( * ) Notice: Subject to any disclaimer, the term of this patent is extended or adjusted under 35 U.S.C. 154(b) by 1469 days.

(21) Appl. No.: 12/299,179

(22) PCT Filed: Feb. 5, 2007

(86) PCT No.: PCT/DE2007/000222
§ 371 (c)(1),
(2), (4) Date: May 26, 2009

(87) PCT Pub. No.: WO2007/090379
PCT Pub. Date: Aug. 16, 2007

(65) Prior Publication Data
US 2010/0000916 A1    Jan. 7, 2010

(30) Foreign Application Priority Data

Feb. 6, 2006 (DE) .................... 20 2006 001 950 U

(51) Int. Cl.
| | | |
|---|---|---|
| *B01D 65/00* | (2006.01) | |
| *B01D 35/00* | (2006.01) | |
| *B01D 36/00* | (2006.01) | |
| *F02M 37/22* | (2006.01) | |
| *B01D 35/143* | (2006.01) | |
| *F02B 3/06* | (2006.01) | |

(52) U.S. Cl.
CPC ............. *B01D 36/003* (2013.01); *F02B 3/06* (2013.01); *F02M 37/221* (2013.01); *B01D 2201/291* (2013.01); *B01D 35/143* (2013.01)
USPC ............. 210/86; 210/96.2; 210/97; 210/103; 210/109; 210/121; 210/167.08; 210/232; 210/234; 210/235; 210/258; 210/416.4; 55/385.3

(58) Field of Classification Search
None
See application file for complete search history.

(56) References Cited

U.S. PATENT DOCUMENTS

2008/0202079 A1* 8/2008 Girondi ................ 55/385.3

FOREIGN PATENT DOCUMENTS

| DE | 10135592 A1 | 1/2003 |
|---|---|---|
| EP | 0367868 A1 | 5/1990 |

(Continued)

*Primary Examiner* — Dirk Bass
(74) *Attorney, Agent, or Firm* — Patricia M. Mathers

(57) ABSTRACT

The invention relates to a fluid filter (1) comprising a collecting chamber (10) for a liquid which is separated from the fluid, in addition to a filter insert (4) which comprises a filter medium which is permeable to the fluid. The collecting chamber is arranged below the filter medium (5), and a liquid sensor (19) is arranged above the deepest point of the collecting chamber (10) and the liquid sensor (19) is protected from the liquid, at least sectionally, by means of a protective wall (18, 20). Said protective wall (18, 20) extends laterally and/or below the liquid sensor (19) and a liquid permeable connection is provided from the collecting chamber (10) to the fluid sensor (19). The invention is characterized in that the permeable connection extends in a labyrinth like manner such that the fluid flowing through said connection changes direction a plurality of times, the liquid permeable connection allows the fluid to flow in a radial manner from the collecting chamber (10), which surrounds the protective wall, to the liquid sensor. Said liquid sensor is separated from the collecting chamber in the radial direction by at least two protective walls (18, 20), wherein in the radially internal protective wall, the closest to the liquid sensor, a through opening (25) which is as high as or higher than the liquid sensor (19) is provided, and a through opening (25) having the same height or higher than the liquid sensor is provided in at least one protective wall (18) which is arranged in a radial manner further to the outside.

30 Claims, 5 Drawing Sheets

(56) References Cited

FOREIGN PATENT DOCUMENTS

| | | | |
|---|---|---|---|
| EP | 0738528 | A2 | 10/1996 |
| EP | 1188468 | A1 | 3/2002 |
| EP | 1277948 | A2 | 1/2003 |
| EP | 1400271 | A1 | 3/2004 |
| FR | 2601600 | A1 | 1/1988 |
| GB | 2038655 | A1 | 7/1980 |
| JP | 02052958 | U1 | 4/1990 |

* cited by examiner

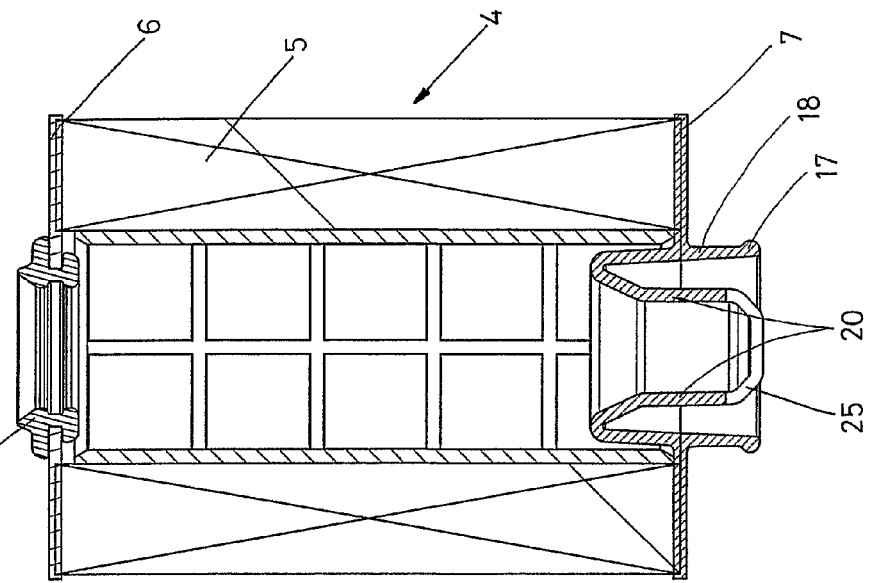
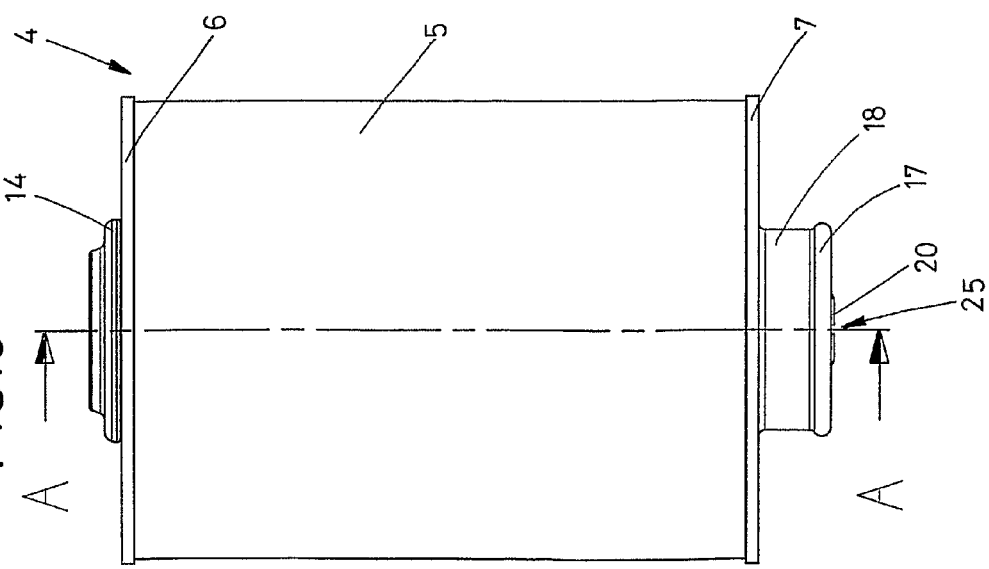

FLUID FILTER COMPRISING A PROTECTED LIQUID SENSOR

BACKGROUND INFORMATION

1. Field of the Invention

The invention relates to a fluid filter. More particularly, the invention relates to a fluid filter, for example, a fuel filter, that has a collection chamber for collecting water separated out from the fuel and a liquid sensor.

2. Description of the Prior Art

Fluid filters with a collecting chamber below the filter medium are known in practice, for example, in the form of fuel filters for combustion engines, particularly as diesel fuel filters for vehicular engines. The fluid to be filtered is thereby the fuel, and the liquid that is to be separated out into the collecting chamber is water. For example, water can get into the fuel, if water from condensation forms in the fuel tank.

In such fluid filters, the filter medium is hydrophobic or is constructed in another way to be water-impermeable, so that the filter insert not only serves to cleanse the fuel of impurities, but also functions as a water separator. The liquid separated out by the filter insert, e.g., water, collects in a collecting chamber below the filter insert.

First of all, the filter itself must be protected from an excessively large amount of collected water: for example, if the filter insert were to constantly stand in water, the filter medium, for example, a paper filter medium, could be damaged; furthermore, the filtering surface available for filtering the fuel would be reduced if the liquid level of the water were too high. Secondly, damage could occur to the combustion engine or the fuel injection system if, due to an excessively high water level in the collecting chamber of the fluid filter, an impermissibly high amount of water were to be delivered with the fuel.

For this reason, it is known to provide a liquid sensor, namely, a water sensor, in the collecting chamber of the fuel filter. The water has a higher specific weight than the fuel. It therefore collects below the fuel or displaces the fuel, which is found at the bottom of the collecting chamber. Additional amounts of water reaching the collecting chamber cause the water level in the collecting chamber to rise.

As soon as the water reaches an excessively high liquid level in the collecting chamber, an alarm is sent, for example, to the operator of the motor or the driver of the vehicle. Alternatively or in addition to this, a protective measure for the combustion engine can be initiated automatically by means of the engine control, for example, a switch-over to an emergency operating system that requires less fuel delivery, whereby the available motor power is clearly reduced, a side effect that is noticeable to the driver of the vehicle.

In practice, it cannot be excluded that there is not only an overall rise in the liquid level in the collecting chamber, but also that apart from the fill volume in the collecting chamber, the liquid in the chamber is subject to centrifugal forces that cause it to slosh back and forth, for example, when the vehicle drives into corners or curves or over bumps on an uneven road surface. As a result, the liquid can come into contact with the liquid sensor before the amount of liquid in the collecting chamber has reached what is considered to be a critical fill volume. In such a situation, the liquid sensor therefore emits a fill level signal that is characterized as erroneous information or faulty signaling within the context of the present proposal, because the registered contact of the liquid sensor with the liquid does not correspond to the actual liquid level within the collecting chamber.

DE 101 35 592 A1 discloses a generic fluid filter in the form of a fuel filter. In this fuel filter, the liquid sensor is surrounded by a hat-shaped closer, the upper end of which forms a collar-like ring flange, and which has several windows in its circumferential walls and forms a seal with its lower frontal surface resting on a flat gasket. When the liquid sensor is removed, the closer, which is spring biased, is raised, so that water from the collecting chamber flows out past the flat gasket, thus enabling the collecting chamber to be emptied. This closer is not provided as a protective wall against fluctuating liquid levels due to sloshing water. It is rather a part of a closure or valve that automatically opens when the water sensor is removed, so that now water can automatically flow out of the collecting chamber through the opened valve.

As expressly mentioned in DE 101 35 592 A1, with the water sensor removed, the resulting opening enables air to flow into the housing from the outside and water to flow off unimpeded. It is, however, certainly not clear in DE 101 35 592 A1 how, with the liquid sensor installed, water, which passes through the windows into the interior space of the hat-shaped closer, could reach the water sensor, in order to moisten the sensor contact there and thus trigger the desired alarm signal.

The interior space surrounded by the hat-shaped closer is, namely, closed toward the top and has the aforementioned windows only below the sensor contacts. Ingress of water through the windows can certainly displace the fuel that is found at the window level in this interior space. It is, however, not possible that the water level in the interior space of the closer will continue to rise, because the fuel does not represent a compressible medium, and in any case is not appreciably compressible under the pressures of ca. 8 bars that typically prevail in a fuel filter.

The closer is not provided as a protective wall against fluctuating liquid levels caused by sloshing water, because merely this single wall, in the form of the hat-shaped closer, is provided between the interior space where the water sensor is located and the surrounding water collecting chamber, and several windows are provided in this closer, and, as DE 101 35 592 A1 expressly mentions, the windows are supposed to enable the free flow of water. Furthermore, because they are supposed to be arranged explicitly evenly distributed around the periphery of the closer, impeding the water flow is neither intended nor even at all possible.

The object of the invention is to improve a generic fluid filter that provides the most trouble-free operation possible of a combustion engine in cooperation with a fluid filter and that avoids erroneous liquid sensor information. An additional object of the invention is to specify a filter insert suitable for such a fluid filter.

BRIEF SUMMARY OF THE INVENTION

The objects of the invention are solved by a fluid filter that has a collecting chamber for collecting a liquid, for example water, that is separated out from another liquid, for example, fuel for an internal combustion engine. The filter according to the invention is a liquid sensor that is mounted at the lower end of the insert and is at least partially surrounded by at least two protective walls. The protective walls have one or more through-openings so as to provide a labyrinthine flowpath for liquid to flow into the area around the liquid sensor. This labyrinthine flowpath selectively prevents liquid that is sloshing around in the collecting chamber from impinging on the liquid sensor and causing the sensor to send a faulty signal.

In other words, the invention proposes to protect the liquid sensor by a protective wall against liquid that is sloshing around in the collecting chamber, that is, to quasi encapsulate it. According to the invention, this encapsulation is not complete: in order to ensure the functionality of the liquid sensor, a liquid-permeable connection or flowpath is provided, not in the vertical direction, but rather, in the radial direction, from the liquid sensor outward to the collecting chamber that surrounds the protective wall.

According to the invention, two protective walls are provided that create a labyrinth-like course of this flowpath and thus a labyrinthine path for the water. This enables an especially reliable protection against faulty signals of the liquid sensor, because the outer protective wall absorbs the pressure of the sloshing liquid, and only liquid that reaches the outer protective wall through the through-openings hits the inner protective wall at a comparably low pressure. The probability is low that the liquid will reach the liquid sensor with brief undulations or wave motions of the liquid.

Rapid movements of the water level, which occur when water sloshes around, are thereby attenuated and practically do not occur at all in the interior space of the innermost protective wall. In contrast to the rapid movements of the liquid level that are caused by the effects of centrifugal forces at work when a vehicle drives fast around corners or curves or over bumps of uneven road surfaces, the increasing amount of liquid that is separated out in the filter changes the fluid level relatively slowly.

The heavier liquid, for example, water in a fuel filter, can reach the interior space that is surrounded by the inner protective wall by means of the above mentioned connection or flowpath, whereby the lighter liquid can escape through the through-openings in the protective walls, similar to a ventilation effect, and, because these through-openings are arranged at least at the level of the liquid sensor, the heavier liquid can rise up to the liquid sensor in the aforementioned interior space without a problem.

If the disrupting influences, e.g., a triggering of the liquid sensor even though the liquid level has not reached a critical fill level, occur from a certain direction, due to a certain, known geometry in the interior space of the fluid filter, it can suffice to arrange merely a portion of the protective wall next to and/or below the liquid sensor, for example, in a semicircle around the liquid sensor.

A particularly reliable shielding and protective effect against faulty signals can be obtained by having the protective wall surround the liquid sensor on almost all sides, i.e., surrounding it quasi-hood-like, whereby, comparatively speaking, at least one small through-opening, namely, a hole-like or slit-like through-opening, is provided in the protective wall, which enables reliable contact between the liquid and liquid sensor during the slow, typical rise of the liquid level caused by an increasing amount of liquid that is separated out.

The comparatively rapid movements, which occur as a result of uneven road surfaces or occur for a brief duration due to fast driving around curves or corners, will, however, not be enough to enable contact between the liquid and the sensor, because of this small opening. This, therefore, prevents with a high degree of reliability such faulty signaling of the sensor as are briefly caused during vehicle operation.

According to the invention, one particularly advantageous achievement is that there is no need for an electronic evaluation of the sensor signals and a corresponding adjustment of the engine control, A modified engine control would be conceivable as an alternative to the recommended shielding of the liquid sensor, an engine control, that, for example, assesses the sensor signals with a certain tolerance duration. With such an engine control, sensor signals that do not endure beyond a pre-specified time period would not trigger an alarm or interfere with the fuel delivery. In contrast, the embodiment of the fluid filter according to the invention enables a simple improvement of the response behavior of the liquid sensor, even in existing vehicles, by retrofitting the corresponding protective wall. This can be done, for example, during regular maintenance servicing, when the fluid filter is already being worked on.

Arranging the through-openings between these two protective walls offset to one other particularly provides an effective barrier to local, high-rising, i.e., sloshing, liquid level of brief duration, whereas a slowly rising liquid level, such as that caused by the increasing amount of separated out liquid, can reach the liquid sensor through the through-openings without a problem and result in the desired signaling of the sensor.

Advantageously, the protective wall can be provided on the filter insert. In this way, the liquid sensor can be easily accessed following the removal of the filter insert, and the handling of the component with the protective wall thereby becomes particularly simple, because the protective wall can be handled together with the filter insert.

An especially inexpensive and advantageous embodiment is one in which the protective wall is provided on an end plate that is on the filter insert. Thus, it is known in the art to construct the filter medium, for example, as a ring-shaped, pleated-paper filter medium, whereby this medium is secured between two end plates.

The protective wall can, for example, be clipped onto one of the end plates. Thus an existing filter insert can be economically retrofitted in order to enable protection of the liquid sensor according to the invention. It is in so far not critical, if the component with the protective wall does not seat completely leak-proof on the filter insert, as the resulting cracks or gaps, in terms of the aforementioned narrow through-openings, can enable the liquid ingress to the liquid sensor or the displacement of another fluid from the space in which the liquid sensor is located inside the protective wall. In this way, with a slow rise of the liquid level, it is ensured that the liquid can reach the liquid sensor.

In an economically particularly advantageous manner, the construction of the protective wall can be integrated together with the end plate of the filter insert, as a single component, so that the number of components to be manufactured, assembled, and handled is advantageously and cost-effectively reduced and the necessary material costs can be kept as low as possible.

The filter insert can advantageously have a receiving chamber through which a retainer bearing the liquid sensor extends. The filter insert can, for example, as already mentioned, have a more or less ring-shaped cross-section, for example, a circular cross-section. The unfiltered side of the filter can thus extend radially on the outside, and the filtered fluid that has passed through the filter medium can flow off to a central outlet port on the interior, that is, on the filtered side of the filter. The retainer bearing the liquid sensor can be provided in this inner cavity on the filtered side of the filter insert. If the filter insert has ring-shaped end plates, it is unproblematic to have the retainer extend through the filter insert to just below the filter insert, so that the liquid sensor, as a water sensor for the water separated from the fuel, is disposed in a collecting chamber that is situated below the filter insert.

Advantageously, the filter can be constructed in conventional manner with a filter housing in which the filter insert is disposed, whereby a removable cover provided on one end of the filter housing enables the removal and replaceability of the filter insert.

This cover can be provided preferably on the bottom end of the housing, so that the aforementioned retainer extends through the filter insert down into the collecting chamber, and the filter insert can have the aforementioned quasi-hood-like protective wall, by means of which the filter insert can be removed downward from the filter housing and thereby also removed from the liquid sensor. This enables problem-free access to the individual components during the manufacture and assembly of the fluid filter, as well as subsequent problem-free maintenance of the filter, in that the filter insert, together with the protective wall, can be easily removed from the filter when the cover is open. The liquid sensor can meanwhile remain firmly attached to the filter housing, so that there are no exposed electrical cables that could perhaps be damaged inadvertently. The electrical cables to the sensor can instead be protectively installed so as to be inaccessible and can remain at their respective installation site during the entire life of the filter, even during maintenance work on the fluid filter.

Advantageously, the liquid sensor can be arranged on a common holder together with a second sensor. This reduces the number of parts that must be handled during assembly of the fluid filter and can provide an inexpensive, space-saving, electrical contact of the two sensors at a common connector point, one that is not prone to malfunctioning.

The second sensor can, for example, be constructed as a temperature sensor that measures the fuel temperature for diesel fuel and that works in combination with a heating attachment provided in the fuel filter. This can protect the fuel filter against blockage if the diesel fuel threatens to paraffinize at low outside temperatures.

The second sensor, namely, particularly the temperature sensor, can advantageously be arranged a distance above the liquid sensor on the holder, to record the most realistic temperature value inside the fluid filter that is possible.

BRIEF DESCRIPTION OF THE DRAWINGS

Embodiments of the invention are explained in more detail below, based on schematic illustrations.

FIG. 2 shows a vertical cross-section through the filter insert of the fluid filter of FIG. 1.

FIG. 3 shows a side view of the filter insert of FIG. 2.

DETAILED DESCRIPTION OF THE INVENTION

Figure 1:
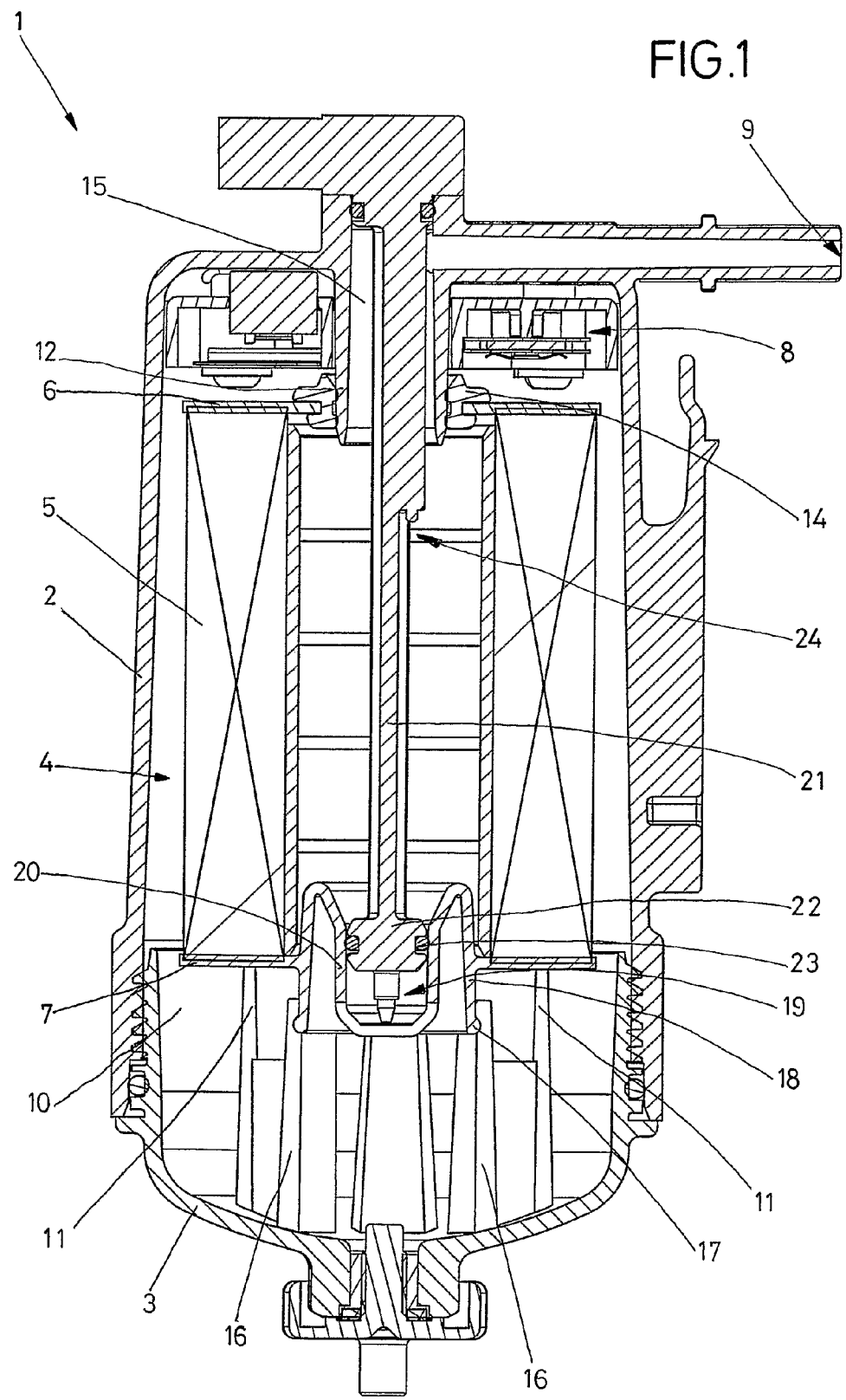
FIG. 1 shows a vertical cross-section through a first embodiment of a fluid filter.

In the drawings, reference designation 1 indicates a fluid filter that serves as a fuel filter. The fluid filter 1 has a housing 2 that is closed at its lower end with a removable cover 3. Inside the housing 2, there is a filter insert 4 that has a filter medium 5 constructed as a paper pleated filter. This is arranged and held between two ring-shaped end plates 6 and 7.

A heater 8 is indicated in the upper area of the housing 2. Ingress of the unfiltered fuel occurs via an inflow that isn't visible in FIG. 1 into the interior space of the housing 2, so that the unfiltered fuel surrounds the outside of the filter insert 4. The fuel passes through the filter medium 5 and reaches the inner, central cavity of the filter insert 4, then rises and exits the fluid filter 1 through an outlet port 9.

Water, which is contained within the fuel, is separated out by the filter medium 5. Due to its higher density, the water collects in the lower area of the fluid filter 1. There, the cover 3 forms a collecting chamber 10 for the separated-out water. The cover 3 has supports 11 that project into the interior of the housing 2 against the lower end plate 7 and thereby hold the entire filter insert 4 in its specified location, so that the filter insert 4 does not slip from a central fitting 12, against which the filter insert 4 abuts with its circumferential gasket 14, and which has an outlet channel 15 that leads to the outlet port 9.

In addition to the supports 11, snap-in hooks or pawls 16 are provided in the cover 3 which point toward the interior of the housing 2 and engage behind a circumferential bulge 17 that is provided on a projection of the lower end plate 7.

This ensures that, when the cover 3 of the housing 2 is removed, the filter insert 4 is also removed along with the cover 3 from the housing 2, allowing maintenance personnel access to the filter insert 4 without having to touch the dirty filter insert 4 itself.

The bulge 17 is shaped as a circumferential edge of a first or outer protective wall 18, which is constructed of the same material as the lower end plate 7 and which surrounds a liquid sensor 19. The outer protective wall 18 thereby surrounds, with some clearance, a second or inner protective wall 20 that is arranged radially further inside and that not only runs laterally around the liquid sensor 19, but also surrounds it below, that is, it extends somewhat hood-like around the entire liquid sensor 19.

The liquid sensor 19 is affixed to the lower end of a holder or retainer 21, which has a sealing head 22 with a circumferential O-ring seal 23 above the liquid sensor 19 and which thus seals the filtered side, that is, the central interior space of the filter insert 4 toward the bottom.

A temperature sensor 24 is provided further up on the retainer 21, so that the retainer 21 enables an economical and reliable arrangement of the two sensors 19 and 24, whereby the electrical conductors that supply the sensors are securely enclosed in the retainer 21. The retainer 21 has an electrical connector on its upper end by means of which the sensors are connected to an engine control, which, for example, controls the heating of the fluid filter 1, as well as triggers warning or protective measures when the liquid sensor 19 signals a high water level in the collecting chamber 10.

Figure 5:
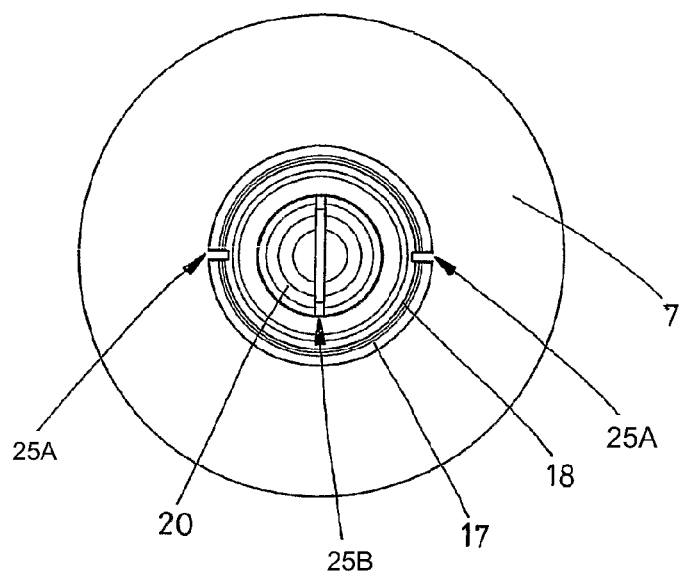
FIG. 5 shows a bottom view of the end plate of FIG. 4.
Figure 4:
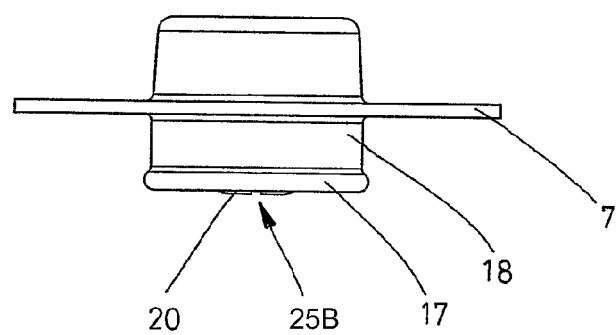
FIG. 4 shows a side view of the lower end plate of the filter insert of FIGS. 1 to 3.
Figure 6:
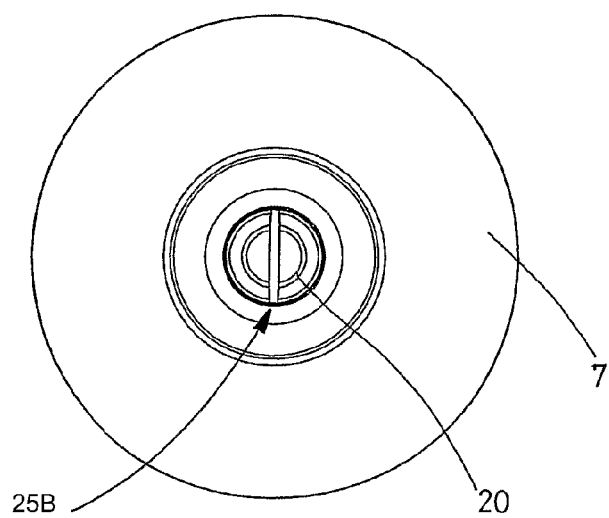
FIG. 6 shows a top view of the end plate of FIGS. 4 and 5.
Figure 7:
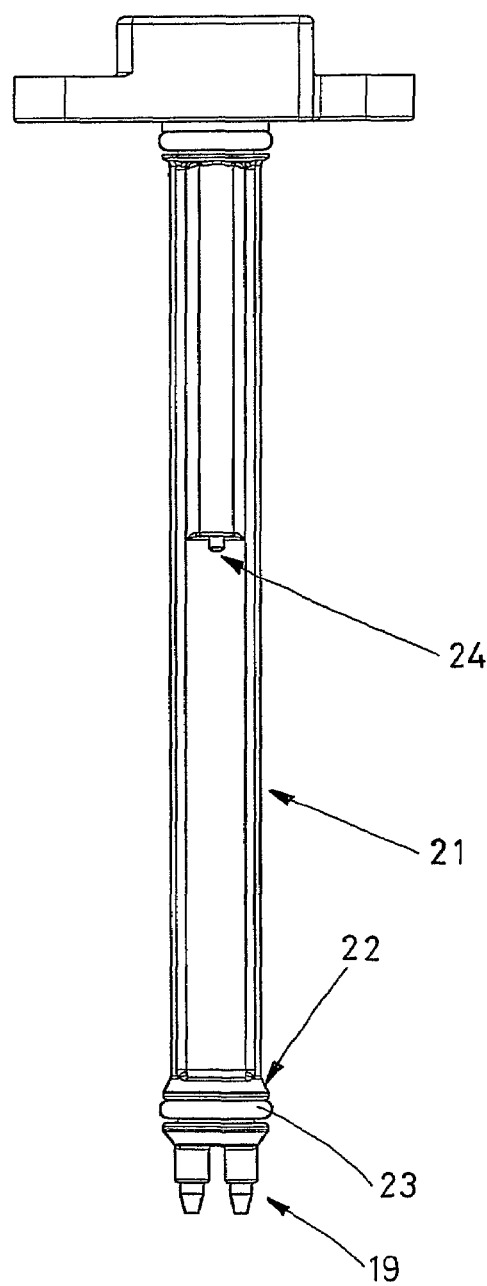
FIG. 7 shows a side view of a holder bearing two sensors.

The lower end plate 7 of the filter insert 4 also forms the two protective walls 18 and 20, that is, they are constructed of the same material as a unitary component. While the outer protective wall is constructed merely as a cylindrical wall, the inner protective wall 20 is also closed toward the bottom, whereby both protective walls 18 and 20 have narrow, slit-like through-openings 25. FIG. 5 illustrates through-openings 25A in the outer protective wall and FIGS. 4 and 6 opening 25B in the inner protective wall 20. The through-openings 25A and 25B of the two protective walls 18 and 20, respectively, extend offset to each other by approximately 90 degrees, in order to make it as unlikely as possible that faulty signals of the liquid sensor are triggered by a sloshing water surface in the collecting chamber 10.

The through-openings 25A in the outer protective wall 18 serve to avoid formation of a fluid cushion, which could otherwise form between the two protective walls 18 and 20 and prevent the liquid that is to be registered by the liquid sensor 19, in this case water, from contacting the liquid sensor 19. The single, slit-like through opening 25B into the interior, hood-shaped protective wall 20 enables the ingress of a slowly rising liquid level into the interior of this protective wall 20, thus allowing the liquid to contact the liquid sensor 19, so that the liquid sensor 19 can reliably respond when the fill level of the water inside the collecting chamber 10 is correspondingly high. The two protective walls 18 and 20, on the other hand, prevent faulty signals caused by a liquid that is sloshing back and forth inside the collecting chamber 10 that is at a level that is overall still an uncritical low liquid level.

Figure 8:
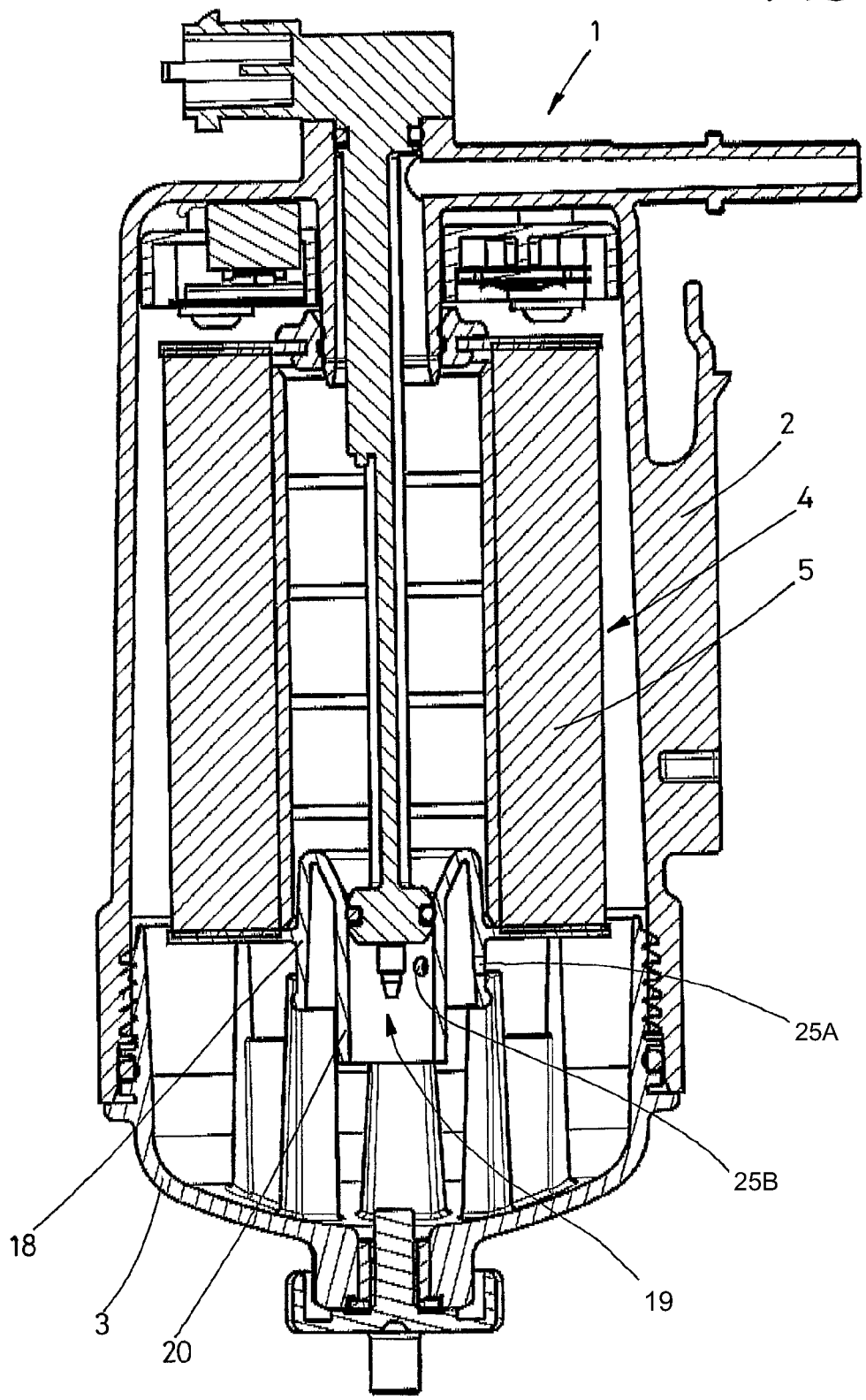
FIG. 8 shows a vertical cross-section of a second embodiment of a fluid filter.

FIG. 8 illustrates a second embodiment of the invention. Components that are identical with or comparable to those of the first embodiment are referenced by the same numbers used for the first embodiment. The construction of the fluid filter 1 corresponds essentially to that of the first embodiment. The through-openings 25A and 25B in the outer protective wall 18 and the inner protective wall 20, respectively, are, however, not designed as slits, but rather as boreholes. FIG. 8 illustrates that the through-openings 25 of this embodiment, too, are arranged offset to each other. The smaller, open cross-section of these through-openings 25 enables a particularly pronounced calming of the water level around the liquid sensor 19. The through-openings 25 are arranged above the liquid sensor 19, which allows a slowly rising water level to easily displace the lighter fuel, so that the water reaches the liquid sensor 19.

The invention claimed is:

1. Fluid filter comprising:
   a collecting chamber for collecting a liquid separated out from a fluid;
   a filter insert having a filter medium that is a fluid-permeable filter;
   a liquid sensor assembled at a lower end of the filter insert;
   at least two protective walls, an inner protective wall and an outer protective wall, that at least partially shield the liquid sensor and selectively prevent the separated-out liquid from impinging on the liquid sensor, the at least two protective walls extending laterally from the liquid sensor, the inner protective wall extending radially around the liquid sensor and having at least one inner-wall through-opening and the outer protective wall extending radially about the inner protective wall and having at least one outer-wall through-opening;
   wherein the collecting chamber is arranged below the filter medium and the liquid sensor is arranged above the lowest point of the collecting chamber;
   wherein the inner-wall through-opening and outer-wall through-opening effect a labyrinthine flowpath that forces fluid flowing through the labyrinthine flowpath to change direction of flow multiple times, yet enables radial flow of the fluid from the collecting chamber surrounding the at least two protective walls to the liquid sensor; and
   wherein the inner-wall through-opening and the outer-wall through-opening are placed at least as high as the level of the liquid sensor.

2. The fluid filter of claim 1, wherein the inner protective wall surrounds the liquid sensor in the form of a hood.

3. The fluid filter of claim 1, wherein the inner-wall through-opening is arranged offset to the outer-wall through-opening.

4. The fluid filter of claim 2, wherein the inner-wall through-opening and outer-wall through-opening are each constructed as a slit opening.

5. The fluid filter of claim 1, wherein the at least two protective walls are provided on the filter insert.

6. The fluid filter of claim 5, wherein the filter medium is arranged between an upper end plate and a lower end plate and wherein the at least two protective walls are connected to the lower end plate.

7. The fluid filter according to 6, wherein the at least two protective walls and the lower end plate together form a single component.

8. The fluid filter of claim 1, further comprising a housing that receives the filter insert, wherein the housing is closed on its lower end by a removable cover, wherein the filter insert is removable downward from the housing when the cover is opened, and wherein the liquid sensor is suspendingly mounted in the housing.

9. The fluid filter of claim 1, wherein the filter insert has a receptacle and wherein a retainer bearing a liquid sensor extends through the receptacle.

10. The fluid filter of claim 1, further comprising a second sensor, wherein the liquid sensor and the second sensor are arranged together on a retainer.

11. The fluid filter of claim 10, wherein the second sensor is a temperature sensor.

12. The fluid filter of claim 10, wherein the second sensor is arranged a distance above the liquid sensor on the retainer.

13. The fluid filter of claim 1, wherein the fluid filter is constructed as a fuel filter, and wherein the filter medium is constructed as a water separator that is impermeable to water.

14. A filter insert for use with a fluid filter, the filter insert comprising:
   a filter medium that is bounded at one end by a lower plate;
   a collecting chamber for liquid separated out from fluid entering the fluid filter;
   a liquid sensor for sensing the level of the liquid in the collecting chamber; and
   a protective barrier that laterally surrounds the liquid sensor;
   wherein the protective barrier is a two-walled barrier that at least partially shields the liquid sensor and selectively prevents the separated-out liquid from impinging the liquid sensor, the protective barrier extending laterally from the sensor and having an outer wall extending from the lower end plate and an inner wall that has a bottom wall, with a portion of the inner wall forming a radial enclosure around the liquid sensor and the outer wall radially surrounding and spaced apart from the radial enclosure; and
   wherein the radial enclosure has a first opening, so as to allow the liquid to rise up into the protective barrier.

15. A protective barrier for a liquid sensor for use in a fluid filter having a filter insert and a collecting chamber, the protective barrier comprising:
   an outer wall and an inner barrier that together at least partially shield the liquid sensor and selectively prevent separated-out liquid from impinging the liquid sensor;
   wherein the inner barrier includes an inner wall that extends laterally about the liquid sensor and a bottom wall that closes a bottom portion of the inner wall below the liquid sensor;
   wherein the outer wall extends laterally about and is spaced apart from the inner barrier, so as to create a space between the inner barrier and outer wall;
   wherein at least one inner-barrier through-opening is provided in the inner barrier and at least one outer-wall through-opening provided in the outer wall, so as to allow liquid to flow from the collecting chamber to the liquid sensor and;

wherein the inner-barrier through-opening and the outer-wall through-opening together reduce a sloshing motion of the liquid within the inner barrier.

16. The filter insert of claim 14, wherein the first opening is a narrow slit that extends across the bottom wall.

17. The filter insert of claim 14, wherein the outer wall has a second opening, spaced radially offset from the first opening.

18. The filter insert of claim 17, wherein the bottom wall has a perimeter at a transition to the inner wall and wherein one or more inner-wall openings are spaced about the perimeter, the one or more inner-wall openings extending to a height level corresponding to a height level of the liquid sensor, thereby allowing the separated liquid level to rise to the liquid sensor.

19. The filter insert of claim 18, wherein the one or more inner-wall openings are narrow openings.

20. The filter insert of claim 14, wherein the protective barrier and the lower end plate are formed as a unitary component.

21. The filter insert of claim 14, wherein inner wall is integrally formed as a continuation of the outer wall.

22. The filter insert of claim 17, wherein the second opening is offset radially by 90 degrees from the first opening.

23. The protective barrier of claim 15, wherein the filter insert has a lower end plate and wherein the outer wall extends from the lower end plate.

24. The protective barrier of claim 15, wherein the outer wall is integrally formed as an extension of the lower end plate.

25. The protective barrier of claim 15, wherein the outer wall and the inner barrier are formed as a unitary piece.

26. The protective barrier of claim 25, wherein an upper end of the inner wall and an upper end of the outer wall are integrally formed, such that the space formed between the outer wall and the inner barrier is closed at an upper end of the space.

27. The protective barrier of claim 15, wherein the at least one outer-wall through-opening is spaced radially offset from the at least one inner-barrier through-opening.

28. The protective barrier of claim 15, wherein the at least one inner-barrier through-openings includes a first opening that is a narrow slit that extends across the bottom wall.

29. The protective barrier of claim 15, wherein the bottom wall has a perimeter at a transition to the inner wall and wherein the at least one inner-barrier through-opening includes perimeter through-openings that are spaced about the perimeter and extend to a height level that corresponds to a height level of the liquid sensor, thereby allowing a liquid level within the inner barrier to rise to the liquid sensor.

30. The protective barrier of claim 29, wherein the perimeter through-openings are narrow openings.

* * * * *